Inventor:
Gunther Missbach
By Watson, Cole, Grindle & Watson
Attys.

April 18, 1967  G. MISSBACH  3,314,110
APPARATUS FOR CONTINUOUSLY SHAPING PLASTIC MATERIALS
Filed May 31, 1963  2 Sheets-Sheet 2

Inventor:
Günther Missbach
By Watson Cole Grindle & Watson
Attys.

United States Patent Office 3,314,110
Patented Apr. 18, 1967

3,314,110
APPARATUS FOR CONTINUOUSLY SHAPING PLASTIC MATERIALS
Günther Missbach, Heckstrasse 101, Essen-Werden, Germany
Filed May 31, 1963, Ser. No. 284,486
5 Claims. (Cl. 18—21)

The invention relates to an appaartus for continuously shaping plastics materials, in particular thermoplastic materials, by means of a revolving drum provided at its periphery with suction orifices and which serves as a mounting support for the mould and against a part of the periphery of which material in foil form to be shaped is brought to bear using the vacuum forming method, means being provided for heating the foil to the shaping temperature in the region of the mould and for cooling it down again if necessary after the shaping operation has been completed.

During this process, the interior of the revolving suction drum is kept under vacuum and the suction orifices of the moulds are connected with the interior of the drum in each instance over a predetermined part of their path of rotation. A machine operating on this basic principle is described in United States Patent No. 2,387,747, in which a continuously operating double drum assembly is described. In this known machine, means of very complicated construction and, correspondingly costly to manufacture are required for maintaining and controlling the vacuum necessary for the forming process over the desired part of the drum periphery. These means consist of a carefully ground valve plate arranged in each case in an end face of the drums and which rests vacuum-tight against the drum. Since it is extremely difficult to ensure the proper contact of the valve plates for a lengthy period of time, the machine has a high fault liability, in addition to the high cost of manufacture already mentioned.

Furthermore, a machine operating on this basic principle is described in Austrian Patent No. 207,109, in which the drum, provided at its periphery with suction orifices, is rotatably mounted on a roll provided with the distributing ducts. On rotation of the drum, the suction orifices slide over the distributing ducts located in the surface of the roll, whereby the suction orifices are connected alternately to sub-pressure and superpressure. It is also very difficult in this type of construction to ensure a good sealing action of the moving surface of the drum on the distributing roll, more particularly as the drum undergoes thermal expansion during operation.

According to the present invention, these drawbacks are avoided in that with each row or group of suction orifices there is associated a changeover valve rotating with the drum, which valve is so connected on the one hand to atmosphere and on the other hand with the mould and with the interior of the drum that the valves, actuated by a stationary control disc, connect the mould with the atmosphere and with the vacuum in the interior of the drum in succession as they rotate.

Advantageously, the changeover valves comprise disc valves oriented in opposite directions to one another and subject to the pressure of a common spring. The disc valves may be slidably mounted on a tappet actuated by the stationary control disc and can be operated in succession by the tappet. The valve tappet may be urged against the control disc by means of a compression spring mounted lengthwise inside the valve tappet.

In order to protect the tappet from lateral forces which could be transmitted to it from the control disc, pivotable bars are provided between the control disc and the valves, in such manner that the valve tappets are actuated indirectly by way of the bars.

In known machines of this kind, the relatively heavy drum is mounted at both its ends on a shaft which is generally hollow and is connected to the vacuum installation. In the region of the interior of the drum the shaft has orifices through which the drum is evacuated by the vacuum installation. The mould is generally fixedly mounted on the drum shell, a special drum being generally necessary for every design or shaping pattern which is to be produced.

For this reason the changing of the drums is very complicated and time-consuming, since at least one of the bearings must be removed to enable the drum to be changed. The removal and the withdrawal of the shaping drum from its bearings thus causes relatively long stoppages of the machine and high assembly costs in each instance.

According to a subsidiary feature of the invention, these drawbacks are eliminted, inter alia, mounting the drum in cantilever fashion. Advantageously, the drum can be secured, detachably and with suitable seals, by means of a drum shell forming part of the drum to a rotatable disc connected to the drive and serving as a support for the drum, the disc at the same time, forming an end wall of the drum. It is possible, in a preferred embodiment of the invention, for the rotatable disc to be mounted on a stationary hollow shaft connected to the vacuum installation. After bolts, by which the drum shell is secured to the end wall, have been undone, the drum shell can be removed and replaced by another one. The replacement drum shell may have a different external diameter but the fixing and connecting dimensions (seat and the spacing of the bolts, etc.) are the same. Furthermore, the other end wall of the drum is likewise advantageously in the form of a cover detachably connected to the drum. In this way, the cover is also the same for the different sized shaping drums, so that when a change is made from one design to another only the drum shell with the mould is changed. Furthermore, this construction makes it possible to have easy access to the interior of the drum.

Further details of the invention will now be described with reference to the accompanying drawings of which:

Figure 1:
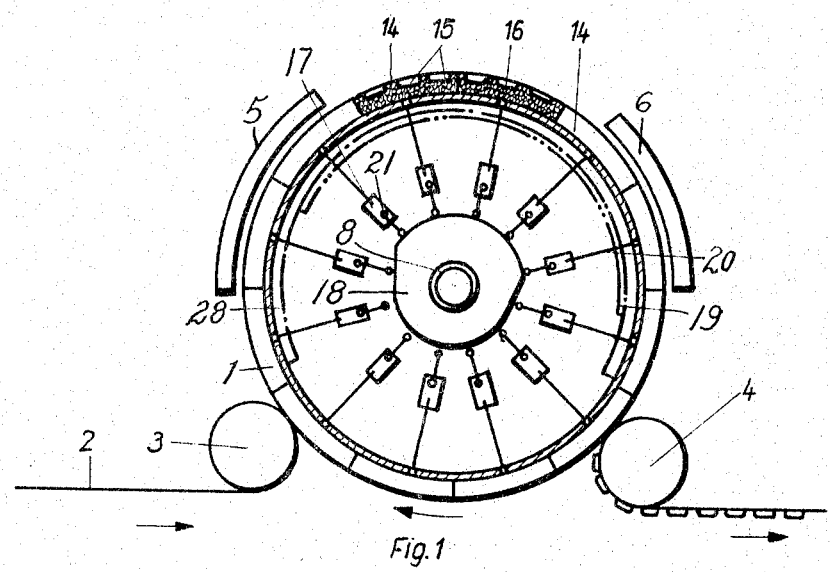
FIG. 1 is a cross-section in diagrammatic form through the drum.

The machine has a shaping drum 1 illustrated in FIG. 1 in diagrammatic form which is driven by means not shown in the drawing and to which foil 2 of a plastics material to be shaped is fed by way of a guide roller 3. After moving round the major part of the periphery of the drum, the foil is taken off the drum by the guide roller 4. The foil is sucked against the surface of the drum by vacuum through means to be described later in detail. A small distance from the surface of the drum, heating radiators 5 are provided by which the foil is heated so that it can be shaped under the action of the vacuum. After shaping has been effected, cooling air is blown on to the foil by apparatus indicated at 6 so as to obtain rapid setting or hardening of the foil.

The drum is constructed in the following manner:

The machine has a frame member 7 in which is arranged a stationary hollow shaft 8 on which an end wall 9 serving as a support for the drum is rotatably mounted, suitable seals being provided as shown. The drum is made up of a drum shell 10, end rings 11, 12 and a second end wall 13, which latter seals the interior of the drum off from the atmosphere. The interior of the drum is connected by way of the hollow shaft 8 to a vacuum apparatus which maintains the interior under vacuum.

Figure 2:
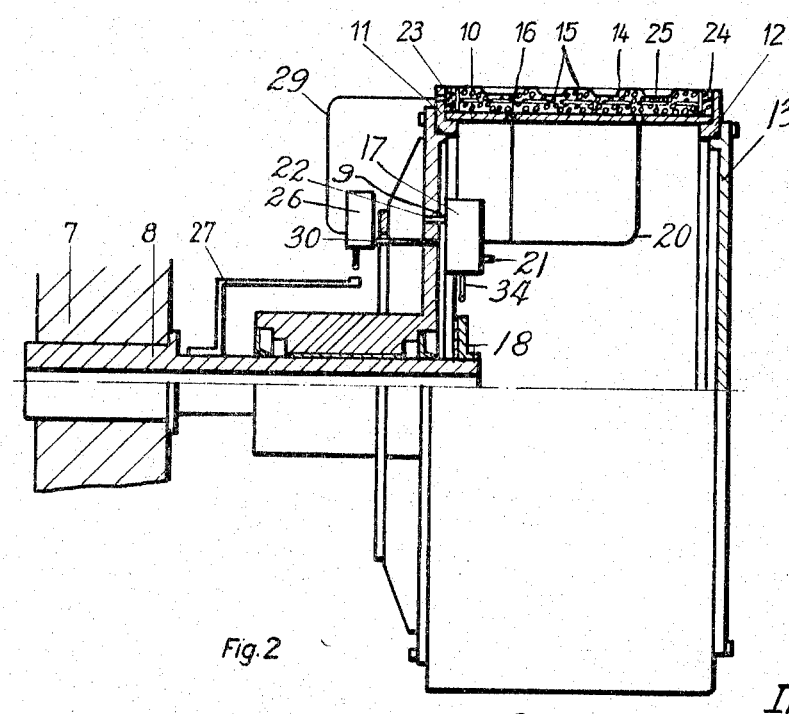
FIG. 2 is a median longitudinal section through the machine.

Mounted on the drum shell 10 is a mould 14 consisting of a porous mass into which is let a mould facing or covering 15, having packets as shown. The mould facing 15, which consists of electro-plated metal, has fine holes at the innermost parts of the mould pockets for drawing off air enclosed in the latter. The mould 14 consists of separate segments 14' sealed off from one another and one or more bores 16 through the drum shell 10 are provided within each segment. Furthermore, a separate changeover valve 17 mounted on the end wall 9 is associated with each segment. As the drum revolves, these valves are actuated by a stationary control disc 18 mounted on the hollow shaft 8. The position of the control disc can be altered by means of the clamping rings 40 (FIG. 2). In a certain zone (designated in FIG. 1 by the reference 19) of the revolving drum, the valves 17 connect the orifices 16 of the mould segments 14' with the vacuum in the interior of the drum by way of hoses 20 and an orifice 21 of the valve. Over the remainder of the drum periphery, the orifices 16 of the drum segments are in communication with the atmosphere by way of the valves 17 and orifices 22 in the latter.

Figure 3:
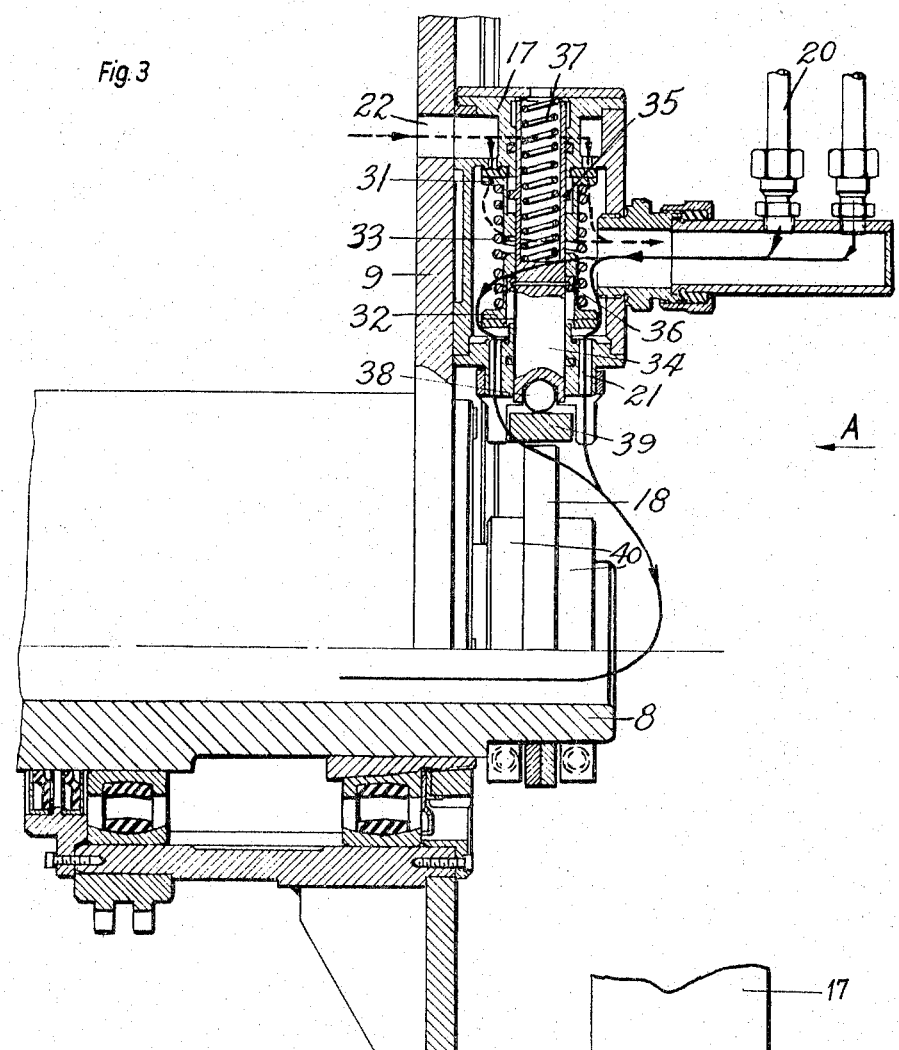
FIG. 3 shows on a larger scale a changeover valve in longitudinal section.
Figure 4:
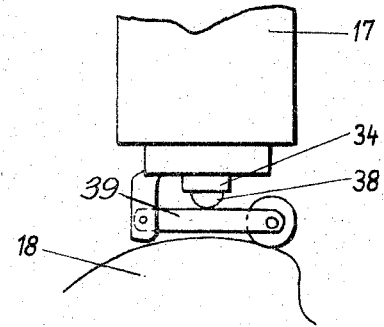
FIG. 4 is a view in the direction of the arrow in FIG. 3.

Each changeover valve 17 (shown in FIG. 3) consists of disc valves 31, 32 oriented in opposite directions to one another and which are supported one against the other by means of a compression spring 33. The disc valves are guided so as to be longitudinally slidable on a valve tappet 34. Shoulders 35 and 36 are provided on the tappet for opening the disc valves against spring 33. The tappet is hollowed at its upper end (as seen in FIG. 3) by boring and a compression spring 37 is mounted in the bore. To prevent wear occurring through friction at the actuating end of the tappet during operation, a ball 38 is rotatably mounted in the end of the tappet and a pivotally mounted bar 39 is also arranged between the control disc 18 and the tappet. In this way, as the drum revolves, the valve tappet is protected from lateral forces.

Recesses 23, 24 are provided in the end rings 11 and 12 of the drum and are filled with a porous mass to form margin zones. This mass is divided into separate segments sealed off from one another and moreover sealed off from the mould segments 14. In each segment the recesses 23 and 24 of the segment are connected to one another by a tube 25. With each of the recesses 23, 24 there is associated a shut-off or disconnecting valve 26 which is arranged externally on the end wall 9 of the drum. As the drum revolves, these valves are opened and closed by way of a control member 27 mounted on the hollow shaft 8. In the zone designated in FIG. 1 by the reference 28, the valves connect the margin zones with the vacuum in the interior of the drum by way of the conduits 29 and 30, while in the remaining zone they cut off this connection. As can be seen in FIG. 1, the zone 28 extends over a greater part of the drum periphery than does the zone 19.

The apparatus operates in the following manner:

The foil fed to the drum is drawn against it at its edges under the action of the vacuum on the margin zones formed by the recesses 23, 24 and retained until shortly before it is removed from the drum. This is of advantage in the subsequent heating and shaping of the foil, since it is ensured in this way that the foil cannot distort through the effect of the heating and shaping operations and, furthermore, the conditions are created for a satisfactory drawing-off of air between the foil and the mould facing and in the mould pockets through the orifies 16 over the peripheral zone 19. This air is sucked off through the fine holes located in the pockets and through the mould mass, so that the foil can conform completely in the mould.

As the valves are not in direct operative communication with the suction orifices in the drum, but indirectly by way of the readily detachable hose lines, the invention is advantageous when another mould is to be used, i.e., a different pattern is to be produced, for which purpose a new drum must be installed in most cases. Such installation is made easier on machines incorporating the present invention.

I claim:

1. Apparatus for continuously shaping plastics materials comprising in combination a revolvable drum, vacuum apparatus connected to the drum for placing the interior thereof under vacuum, a plurality of mould segments mounted on the periphery of the drum, said drum being formed with a plurality of groups of suction orifies around its periphery, each said mould segment being associated with at least one group of suction orifices, for each group of suction orifices, a changeover valve for connecting the orifices of the group of the interior of the drum and to atmosphere as desired, a stationary control disc in the drum for operating the changeover valves, a shaft on which the drum is mounted, and means mounted on each side of the disc to adjust the position of the latter on the shaft.

2. Apparatus for continuously shaping plastics materials comprising in combination a revolvable drum, vaccum apparatus connected to the drum for placing the interior thereof under vacuum, a plurality of groups of suction orifices formed in said drum around the periphery thereof, for each group of suction orifices a changeover valve comprising two oppositely facing disc valves, a common spring mounted between said disc valves urging them apart, a valve tappet on which said disc valves are slidably mounted, one of said disc valves being operable to connect the orifices of the group to the interior of the drum, the other disc valve being operable to connect the orifices of the group to atmosphere, and a stationary control disc for actuating the valve tappets.

3. Apparatus as claimed in claim 2 and further comprising, for each valve tappet, a compression spring for uring the tappet towards the said control disc and a longitudinal housing inside the said tappet for said compression spring.

4. Apparatus as claimed in claim 2 and further comprising, for each valve tappet, a compression spring for urging the tappet towards said control disc, a longitudinal housing inside the said tappet for said compression spring, a tappet operating lever, a pivotable mounting for said lever whereby the latter is operatively connected between said tappet and said control disc.

5. Apparatus as claimed in claim 2 and further comprising, for each valve tappet, a compression spring for urging the tappet towards said control disc, a longitudinal housing inside the said tappet for said compression spring, a bearing ball mounted at one end of said tappet, a tappet operating lever, a pivot mounting for said lever whereby the latter is in contact with said bearing ball and is operable by said control disc.

References Cited by the Examiner

UNITED STATES PATENTS

| | | | |
|---|---|---|---|
| 2,497,212 | 2/1950 | Donofuo | 18—21 XR |
| 2,902,718 | 9/1959 | Martelli | 18—21 XR |
| 3,124,840 | 3/1964 | Taylor et al. | 18—21 |
| 3,226,458 | 12/1965 | Groff et al. | 18—21 XR |

WILLIAM J. STEPHENSON, *Primary Examiner.*